US008280593B2

(12) United States Patent
Nakakura et al.

(10) Patent No.: US 8,280,593 B2
(45) Date of Patent: Oct. 2, 2012

(54) VEHICLE DOOR OPENING ANGLE CONTROL SYSTEM

(75) Inventors: Yohei Nakakura, Anjo (JP); Toshiyuki Konishi, Anjo (JP); Hideki Hioki, Ichinomiya (JP); Yoshihisa Okada, Kariya (JP)

(73) Assignee: Denso Corporation, Kariya (JP)

( * ) Notice: Subject to any disclaimer, the term of this patent is extended or adjusted under 35 U.S.C. 154(b) by 128 days.

(21) Appl. No.: 12/660,626

(22) Filed: Mar. 2, 2010

(65) Prior Publication Data

US 2010/0228448 A1 Sep. 9, 2010

(30) Foreign Application Priority Data

Mar. 3, 2009 (JP) ................................ 2009-049776
Feb. 19, 2010 (JP) ................................ 2010-034856

(51) Int. Cl.
*B60R 22/00* (2006.01)

(52) U.S. Cl. ......................................... 701/49; 340/435

(58) Field of Classification Search ................... 701/49, 701/36, 45, 300; 340/435
See application file for complete search history.

(56) References Cited

U.S. PATENT DOCUMENTS

| | | | | |
|---|---|---|---|---|
| 7,686,378 | B2 * | 3/2010 | Gisler et al. | 296/146.4 |
| 7,761,209 | B2 * | 7/2010 | Morris et al. | 701/49 |
| 2005/0280518 | A1 * | 12/2005 | Bartels et al. | 340/435 |
| 2007/0032953 | A1 * | 2/2007 | Samukawa et al. | 701/301 |

FOREIGN PATENT DOCUMENTS

| | | |
|---|---|---|
| JP | 2-132515 | 11/1990 |
| JP | 2004-157044 | 6/2004 |
| JP | 2004-230993 | 8/2004 |
| JP | 2006-349449 | 12/2006 |
| JP | 2007-126025 | 5/2007 |

OTHER PUBLICATIONS

U.S. Appl. No. 12/565,245, filed Sep. 23, 2009, Nakakura et al.

* cited by examiner

*Primary Examiner* — Behrang Badii
*Assistant Examiner* — Shardul Patel
(74) *Attorney, Agent, or Firm* — Harness, Dickey & Pierce, PLC

(57) ABSTRACT

A laser sensor projects laser light in the downward direction. If the laser sensor does not receive any laser light reflected by an obstacle or the ground, it is determined that the obstacle is present in the direction of projection of the laser light. It is thus possible to detect the presence of the obstacle, which will at least affect the opening of the vehicle door.

11 Claims, 10 Drawing Sheets

| ANGLE θ | DISTANCE TO OBSTACLE X | SET DISTANCE L | COMPARISON | OBSTACLE |
|---|---|---|---|---|
| θ1 | X1 | L1 | X1>L1 | ABSENT |
| θ2 | X2 | L2 | X2<L2 | PRESENT |
| θ3 | X3 | L3 | X3>L3 | ABSENT |
| ... | ... | ... | ... | ... |
| θn | Xn | Ln | Xn>Ln | ABSENT |

VEHICLE DOOR OPENING ANGLE CONTROL SYSTEM

CROSS REFERENCE TO RELATED APPLICATION

This application is based on and incorporates herein by reference Japanese Patent Applications No. 2009-49776 filed on Mar. 3, 2009 and No. 2010-034856 filed on Feb. 19, 2010.

FIELD OF THE INVENTION

The present invention relates to a vehicle door opening angle control system, which controls the opening angle of a vehicle door not to touch an obstacle.

BACKGROUND OF THE INVENTION

It is conventional, as disclosed in JP-U-2-132515 for example, to provide an ultrasonic sensor on a vehicle door and detect a distance from the ultrasonic sensor to an obstacle so that the vehicle door may be prevented from touching the obstacle when it is opened.

In case of detecting the distance from the vehicle door to the obstacle by generating an ultrasonic wave pulse in a direction perpendicular to the outer surface of the vehicle door from the ultrasonic sensor provided on the vehicle door and receiving the ultrasonic wave pulse reflected by the obstacle, the area, which one ultrasonic sensor can cover in detecting an obstacle, is not sufficient relative to the size of the vehicle door.

According to the conventional system, therefore, a plurality of ultrasonic sensors is provided on one vehicle door to detect an obstacle over a wide area of the vehicle door. However, such a number of sensors necessarily increase total system costs to a large extent.

It is therefore proposed (Japanese patent application No. 2008-246665) to detect an obstacle, which a vehicle door will possibly touch, over almost all surface area of a vehicle door by a single sensor.

In this vehicle door opening angle control system, a laser sensor is provided on a vehicle door near a vehicle door pivot axis. This laser sensor emits laser light to scan a plane, which is deviated a predetermined angle in a direction of opening of the vehicle door. If an obstacle is present within the scanned plane, the laser light is reflected by such an obstacle and received by the laser sensor. It is thus made possible to always detect an obstacle, which is present ahead of the vehicle door by the predetermined angle, when the vehicle door is opened.

However, if a subject vehicle is parked closely in parallel to the other vehicle for example, the laser light projected from the laser sensor becomes incident to the side surface of the other vehicle with a shallow angle of incidence. When the incident laser light is reflected and scattered by the side surface of the other vehicle, a large part of reflected or scattered laser light travels in directions different from the direction toward the laser sensor. The laser sensor thus receives only a small part of the reflected laser light. As a result, it becomes impossible to detect the other vehicle (distance thereto), which is an obstacle, although the other vehicle actually is present. Further, a similar situation, in which a sufficient amount of reflected laser light cannot be received from an obstacle, will arise, if a reflective body is in black or similar color and its reflectivity of the laser light is low.

SUMMARY OF THE INVENTION

It is therefore an object of the present invention to provide a vehicle door opening angle control system, which is capable of detecting an obstacle even in a case that a sufficient amount of laser light cannot be received from the obstacle because of shallow incidence angle of the laser light to the obstacle and a low loser light reflectivity of the obstacle.

A vehicle door opening angle control system according to the present invention comprises a laser sensor, a check section and an opening angle limitation section. The laser sensor is mounted on a vehicle door near a pivot axis of a vehicle door to project a laser light to scan a plane oriented in an opening direction of the vehicle door and receive a reflected laser light reflected by an obstacle. The check section checks whether the obstacle, which the vehicle door is likely to touch, is present in the door opening direction based on projection and reception of the laser light by the laser sensor. The opening angle limitation section limits an opening angle of the vehicle door in case the check section determines that the obstacle is present. The check section determines that the obstacle is present in case that the laser sensor receives no laser light in excess of a predetermined intensity in response to emission of the laser light downward relative to a mounting position of the laser sensor.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described with reference to the embodiments shown in the accompanying drawings.

First Embodiment

Figure 1:
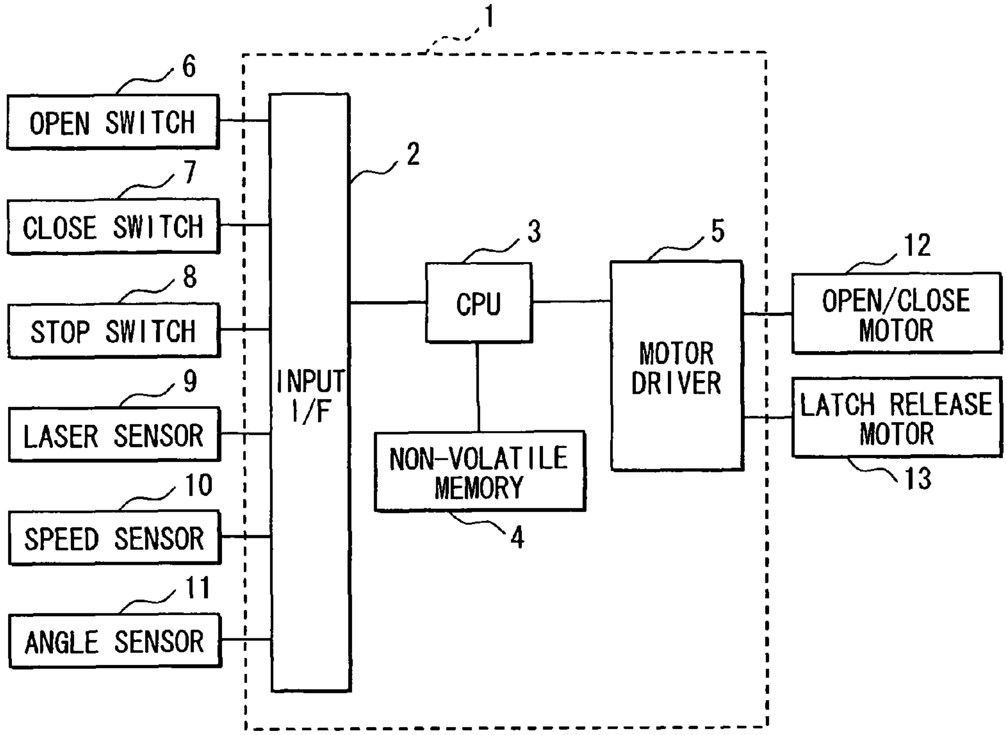
FIG. 1 is a block diagram showing a vehicle door opening angle control system according to the first embodiment of the present invention.

Referring to FIG. 1, a vehicle door opening angle control system is principally configured with an electronic control unit (ECU) 1 for executing various control processing, various switches 6 to 8 and sensors 9 to 11, an open/close motor 12 for opening and closing a vehicle door and a latch release motor 13. With this configuration, the vehicle door is automatically opened and closed by the use of two kinds of motors upon user's switch manipulation.

The vehicle door opening angle control system shown in FIG. 1 is configured to automatically open and close one vehicle door. However, it may be provided for only any one of vehicle doors such as a driver's seat-side door, for both the driver's seat-side door and a front passenger's seat-side door or for all vehicle doors of the vehicle. If the vehicle door opening angle control system according to this embodiment is applied to a plurality of vehicle doors, the same system is provided for each of the vehicle doors.

The various switches 6 to 8 are provided in a vehicle compartment and manipulatable by a user (passenger in the vehicle). An open switch 6 is manipulated to open the vehicle door, and a close switch 7 is manipulated to close the open door. A stop switch 8 is manipulated to stop the vehicle door in the open condition or in the closed condition. When each of the switches 6 to 8 is manipulated, its manipulation signal is outputted to the ECU 1.

The laser sensor 9 is provided, for example, under a door mirror attached to a vehicle door 30 near a pivot axis, which rotatably supports the vehicle door relative to a side body surface of a vehicle. The laser sensor 9 is configured with a light emitting element, a scan mechanism, a light receiving element, a control circuit and the like. The light emitting element emits a laser light. The scan mechanism changes the direction of projection of the laser light emitted from the light emitting element within a predetermined plane thereby to scan the plane by the laser light. The light receiving element receives the laser light reflected by an obstacle. The control circuit calculates a distance to the obstacle based on the elapse of time from the emission of the laser light to the reception of the reflected light. The laser sensor 9 outputs the distance to the obstacle to the ECU upon detection of the obstacle.

Figure 2:
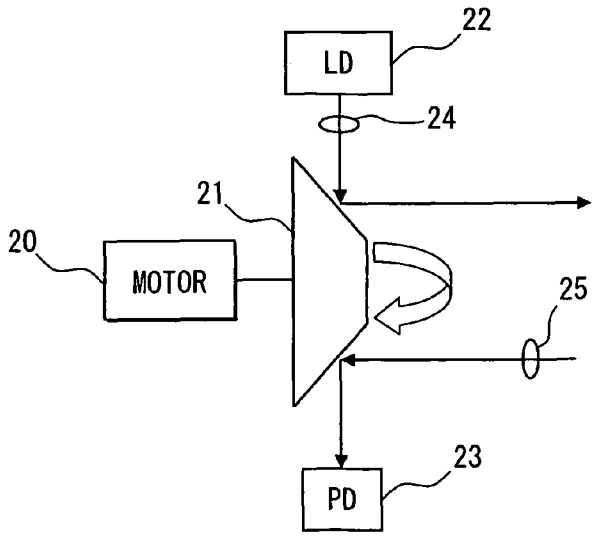
FIG. 2 is a schematic view showing one example of a scan mechanism of a laser sensor.

As shown in FIG. 2, the scan mechanism of the laser sensor 9 is configured with a mirror 21 for reflecting the laser light, a motor 21 for rotating the mirror 21, a lens 24 and a lens 25. The mirror 21 is formed in generally a columnar shape and has two end faces. A reflection surface is formed on its one end surface for reflecting the laser light emitted by the light emitting element 22 is formed. Another reflection surface is formed on its other end surface for reflecting the laser light reflected by the obstacle toward the receiving element 23. By rotating the mirror 21 about a rotation axis, which passes through both reflection surfaces by the motor 21, a plurality of laser lights can be projected to scan the plane formed about the rotation axis as its center. The lens 24 is designed to radiate the laser light in a beam shape or in a predetermined sweep angle. The lens 25 is for collecting received light. The scan plane and the scan range of the laser sensor 9 will be described in detail later.

The scan mechanism shown in FIG. 2 is just an example and may be provided in other conventional configurations. For example, the mirror and its drive part may be formed on a semiconductor substrate by MEMS (micro-electromechanical systems) technology. Further, a polygon mirror may be used as the mirror.

A vehicle speed sensor 10 produces a speed signal corresponding to a travel speed of the vehicle. An opening angle sensor 11 produces a detection signal by detecting an opening angle of the vehicle door when the vehicle door is opened. The signals produced by the speed sensor 10 and the opening angle sensor 11 are also inputted to the ECU 1.

The ECU 1 is configured with an input interface (I/F) 2, a CPU 3, a non-volatile memory 4 and a motor driver 5. The input interface 2 receives the manipulation signals of the switches 6 to 8 and the signals of the sensors 9 to 11. The CPU 3 executes various operation processing according to a predetermined program. The non-volatile memory 4 stores control programs and obstacle detection range data. The motor driver 5 outputs drive signals for driving the open/close motor 12 and the latch release motor 13.

The operation of the open/close motor 12 and the latch release motor 13 in automatically opening and closing the vehicle door will be described next.

The latch release motor 13 is provided inside the vehicle door and operates on a latch mechanism (not shown), which holds the vehicle door at the closure position, thereby to release the latch mechanism. Thus, the vehicle door is allowed to be opened.

The open/close motor 12 is also provided inside the vehicle door and drives a door open/close mechanism (not shown) to open the vehicle door 11 to a fixed opening angle (maximum opening angle) or close the same. When the stop switch 8 is manipulated or the obstacle, which will probably touch the vehicle door, is detected, opening the vehicle door by the open/close motor 12 is prevented even if the opening angle of the vehicle door is less than a fixed opening angle. In this case, the vehicle door is maintained at the opening angle, at which the open/close motor 12 stopped.

The plane and the range of scan by the laser light emitted from the laser sensor 9 will be described next with reference to FIGS. 3 and 4.

Figure 3:
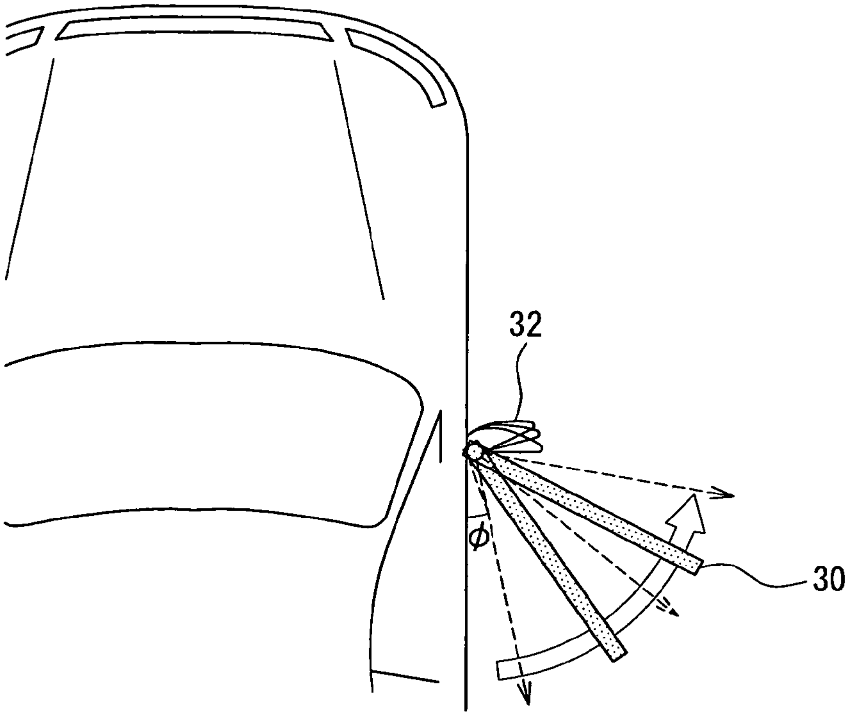
FIG. 3 is a schematic view showing an example of movement of a scan plane of a laser light projected from the laser sensor while maintaining a fixed angle relative to a vehicle door when the vehicle door is opened.

As shown in FIG. 3, the laser sensor 9 provided at the lower part of the door mirror 32 emits the laser light to scan the plane (scan plane of the laser sensor 9), which is deviated from the surface of the vehicle door 30 by the predetermined angle ϕ in the direction of opening of the vehicle door 30.

By setting the scan plane of the laser sensor 9 to a plane, which is different from the surface of the vehicle door 30 by the predetermined angle d), it is possible to always detect the obstacle, which is present ahead of the vehicle door by the predetermined angle ϕ, during a period of opening of the vehicle door 30. Specifically, by setting the scan plane of the laser sensor 9 to a plane, which is ahead of the surface of the vehicle door 30 by the predetermined angle $\phi$, it is possible to detect the obstacle, which the vehicle door will probably touch, over a movable range of the vehicle door 30 while the vehicle door 30 is in the opening motion.

Figure 4:
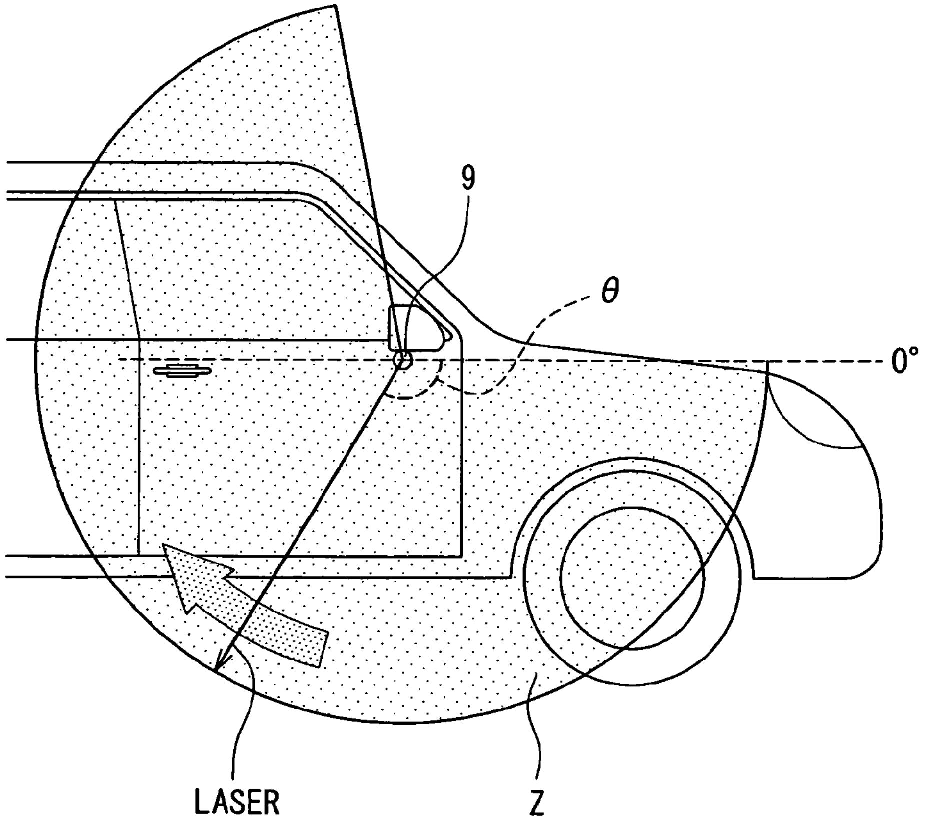
FIG. 4 is a schematic view showing a scan range of the laser light projected from the laser sensor.

The scan range of the laser sensor 9 is set as shown in FIG. 4. As shown in FIG. 4, the scan range of the laser sensor 9 is set to start from a start position (scan angle $\theta$ is 0°) on a line extending in a horizontal direction from the position of the laser sensor 9 (under the door mirror 32) toward the forward part of the vehicle. It is thus also possible to detect the obstacle, which the vehicle door 30 will probably touch in the forward area from the position of the laser sensor 9.

The laser light L of the laser sensor 9 is projected repetitively from the start position in the clockwise direction at every predetermined step angle $\theta x$. The scan range is set to end on a line, which extends in almost right upward from the laser sensor 9 at an angle (scan angle $\theta$ is about 260° in the example of FIG. 4), for example. Thus, the range from the start position and the end position, between which the laser light is projected, is set as the scan range Z of the laser sensor 9.

By scanning the scan plane and the scan range Z by the laser light, it is made possible to detect the obstacle, which the vehicle door 30 is likely to touch, over almost all surface plane of the vehicle door 30 by the single laser sensor 9.

When the laser sensor 9 scans the scan range Z shown in FIG. 4 by the laser light, the laser light will be reflected by chassis parts other than the vehicle door 30, the ground or other obstacles, which the vehicle door 30 will not touch, as well, and such a reflected laser light will also be received by the laser sensor 9. It is not necessary to limit the opening angle of the vehicle door 30 even if such an obstacle present outside the movable range of the vehicle door 30 is detected.

In this regard, the obstacle detection range data (set distance L) is pre-stored in the non-volatile memory 4 thereby to determine accurately whether the obstacle is present inside or outside the movable range of the vehicle door 30 in case the obstacle is detected by the laser sensor 9. The obstacle detection range data is a distance data (set distance L) from the position of the laser sensor 9 to a peripheral end of the vehicle door 30, which varies with the scan angle $\theta o$ of the laser light.

The ECU 1 commands the scan angle, in which the laser light is projected, to the laser sensor 9. When the laser sensor 9 projects the laser light at the commanded scan angle and receives the reflection light from the obstacle or the like, the laser sensor 9 calculates the distance X to the obstacle and outputs it to the ECU 1. The ECU 1 acquires the set distance L to the end of the corresponding vehicle door 30 from the stored obstacle detection range data based on the scan angle $\theta$ of the laser light projected from the laser sensor 9. The ECU 1 then compares the distance X to the obstacle actually detected by the laser sensor 9 and the acquired set distance L. If the comparison result indicates that the actual distance X is shorter than the set distance L, it is determined that the obstacle is present inside the movable range of the vehicle door 30 and is likely to touch the vehicle door 30. If the actual distance X is longer than the set distance L, on the other hand, it is determined that the obstacle is present outside the movable range of the vehicle door 30 and is not likely to adversely affect opening of the vehicle door 30.

Figures 5, 6:
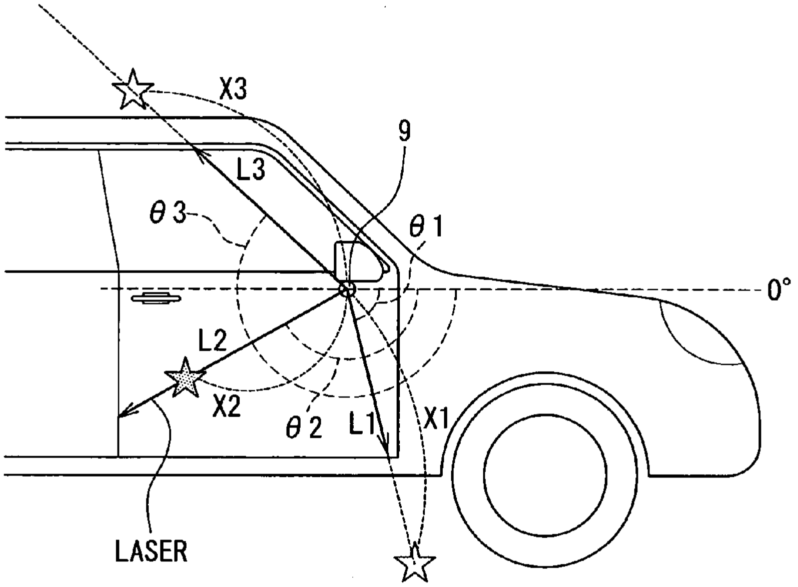
FIG. 5 is a schematic view showing an example of determination of presence or absence of the obstacle within a movable range of the vehicle door by using an obstacle detection range data.
FIG. 6 is a table showing determination results of the example of determination of presence or absence of the obstacle within the movable range made by using the obstacle detection range data.

One exemplary determination as to whether the obstacle is present inside or outside the movable range of the vehicle door 30 is shown in FIGS. 5 and 6. In FIGS. 5 and 6, one example is shown, in which distances X1 to X3 to obstacles indicated by respective star marks are calculated over scan angles $\theta$1 to $\theta$3 and the distances X1 to X3 are compared with set distances L1 to L3, which are pre-stored in correspondence to the respective scan angles $\theta$1 to $\theta$3. In this instance, as shown in FIG. 5, the set distances L1 to L3 indicate distances from the position of the laser sensor 9 to the ends of the vehicle door 30 at the scan angles $\theta$1 to $\theta$3 of the laser light, respectively.

In the example of FIGS. 5 and 6, the distances X1 and X3 to the obstacles detected at the scan angles $\theta$1 and $\theta$3 are determined to be longer than the set distances L1 and D, respectively, as a result of comparison. Thus, as understood from FIG. 6, it is so determined that any obstacle, which will touch the vehicle door 30, is absent at the scan angles $\theta$1 and $\theta$3. However, the distance X2 to the obstacle detected at the scan angle $\theta$2 is determined to be shorter than the set distance L2, as a result of comparison. Thus, as shown in FIG. 7, it is so determined that an obstacle, which will touch the vehicle door 30, is present at the scan angle $\theta$2.

The detection method for detecting the obstacle will be described further with reference to a case that the reflected laser light cannot be received from the obstacle because of shallow incidence angle of the laser light to the obstacle or low reflectivity of laser light by the obstacle.

Figure 7:
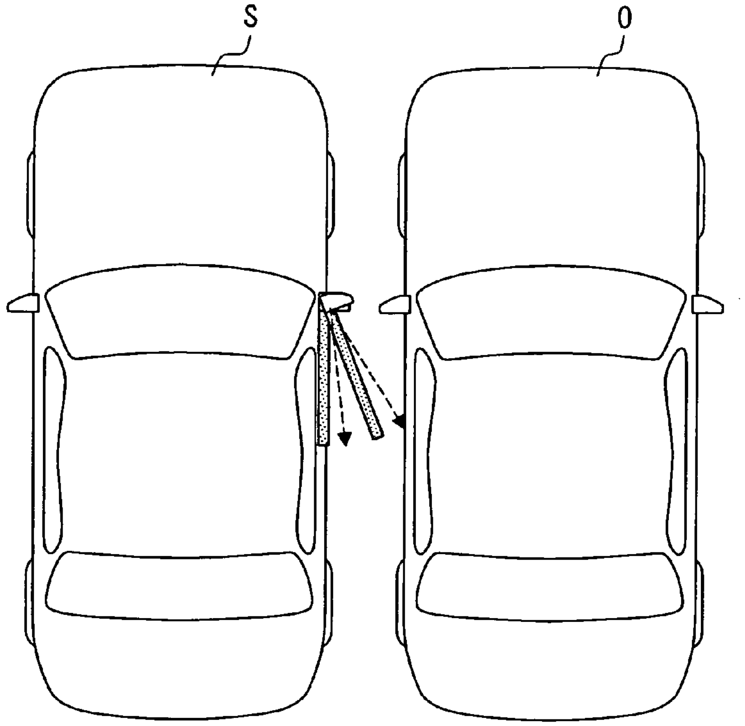
FIG. 7 is a schematic view showing two vehicles, which are parked in parallel.

For example, it is assumed that, as shown in FIG. 7, the subject vehicle S having the vehicle door opening angle control system is parked in parallel to and adjacently to the other vehicle O. In this instance, as shown in FIG. 7, when the vehicle door of the subject vehicle S is opened, the laser light projected from the laser sensor 9 becomes incident to the side surface of the other vehicle O.

Figure 8A:
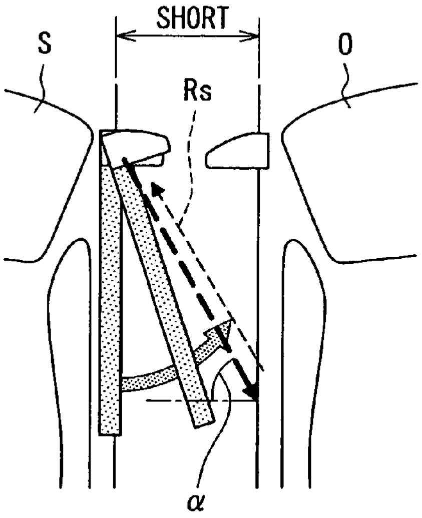
FIGS. 8A and 8B are schematic views showing projection and reception of the laser light of the laser sensor in cases of spacing of a short distance and spacing of a long distance between the two parallel-parked vehicles, respectively.

If the inter-vehicle distance between the subject vehicle S and the other vehicle O is short (small) as shown in FIG. 8A, the angle in which the laser light projected from the laser sensor 9 is incident to the side surface of the other vehicle becomes shallow. That is, the incidence angle $\alpha$, which is the angle between the incident laser light and the plane perpendicular to the side surface of the other vehicle becomes large. As a result, the incident laser light is reflected or scattered on the side surface of the other vehicle mostly in a direction, which is different from the direction toward the laser sensor 9.

The laser sensor 9 thus receives only a small part of the reflected light Rs as shown in FIG. 8A. To avoid erroneous detection caused by noise or the like, the laser sensor 9 only takes up the laser light having an intensity higher than a predetermined level as having been reflected by the obstacle or the ground and calculates a distance based on a time difference between the emission and the reception of the laser light. In case that only a small part of the reflected laser light is received under a condition shown in FIG. 8A, it is not taken up as the reflected laser light and hence the distance to the obstacle cannot be calculated.

Figure 8B:
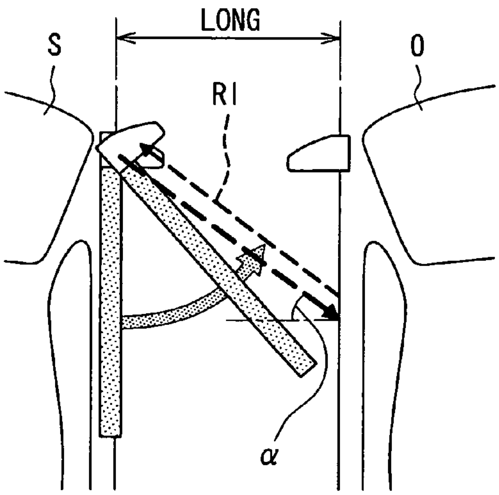

As shown in FIG. 8B, the angle of the laser light incident to the side surface of the other vehicle becomes deeper and the incidence angle $\alpha$ of the laser light becomes smaller, as the inter-vehicle distance between the subject vehicle S and the other vehicle O parked in parallel. As a result, the laser light R1 reflected by the side surface of the other vehicle toward the laser sensor 9 is increased as shown in FIG. 8B. Therefore it becomes possible for the laser sensor 9 to calculate the distance relative to the other vehicle O based on the reception of such a reflected laser light.

If the reflectivity of the laser light is low because of black or dark color of the obstacle, for example, which reflects the laser light, the laser sensor cannot receive the reflected laser light sufficiently from the obstacle either.

If a sufficient amount of the reflected laser light cannot be received because of the shallow angle of incidence of the laser light to the obstacle or the low laser light reflectivity of the obstacle as described above, the obstacle cannot be detected based on the reflected laser light. It is however made possible to detect the distance to such an obstacle by utilizing the laser light projected downward from the laser sensor 9. This detection method will be described in detail below.

Figure 10:
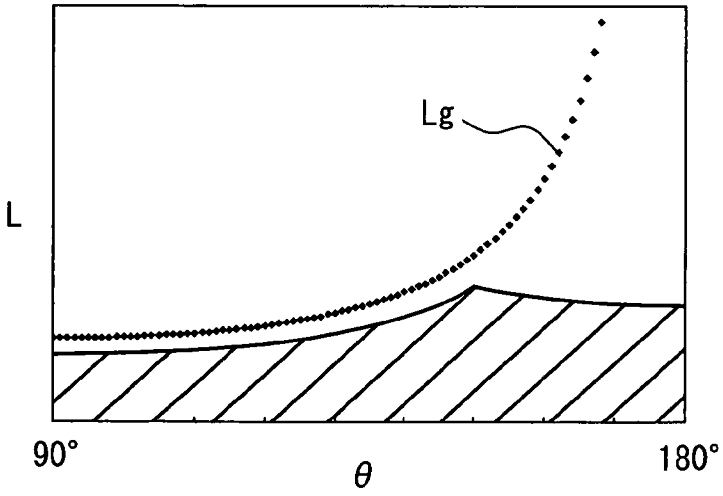
FIG. 10 is a graph showing a distance to the ground in case of absence of the obstacle, the distance being detected based on results of projection and reception of the laser light by scanning the scan area from 90° to 180° by the laser sensor.

This description is made with particular reference to a scan angle range between 90° and 180° shown in FIG. 7 in the entire scan range 0 (between 0° and 260°) of the laser sensor 9. In this scan angle range, the laser light is projected from the laser sensor 9 in the downward direction. Therefore, the laser light is reflected by the ground even when no obstacle is present within the scan angle range. FIG. 10 shows a result of calculation of distances to the ground with respect to each scan angle. Each distance is calculated based on a difference of time between the projection and the reception of the laser light by the laser sensor 9 in case that the laser light is reflected by the ground. As shown in FIG. 10, the distance Lg to the ground increases exponentially as the scan angle increases.

Figure 11:
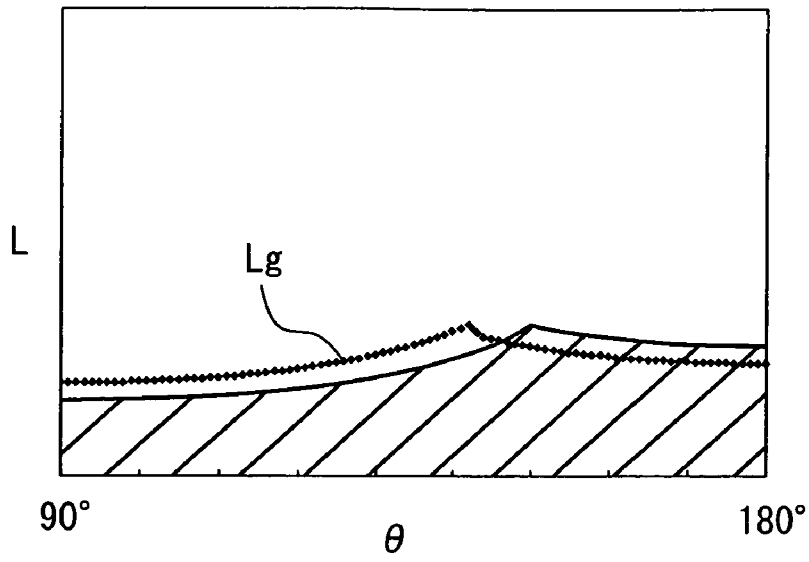
FIG. 11 is a graph showing a distance to the ground and a distance to a next vehicle in case of absence of the obstacle, the distances being detected based on results of projection and reception of the laser light by scanning the scan area from 90° to 180° by the laser sensor.

If the obstacle is present within the scan angle range between 90° and 180° and the laser light is reflected by the obstacle toward the laser sensor 9, the laser sensor 9 receives both laser lights reflected by the ground and reflected by the obstacle. FIG. 11 shows a result of calculation of distances Lg to the ground or the distances Lo to the adjacent vehicle with respect to different scan angles in a case that the laser light reflected by the obstacle is started to be received when the scan angle becomes close to 140° and the reflected laser light from the obstacle is continuously received until the scan angle becomes about 180°. In FIGS. 10 and 11, the hatched areas indicate a door range.

As shown in FIGS. 10 and 11, when the laser sensor 9 emits the laser light in the downward direction from its position, the laser sensor 9 can generally receive the laser light of higher than a predetermined intensity whether the obstacle is present or not. However, when the obstacle is present near the subject vehicle, the angle of incidence of the laser light to the obstacle is shallow or the laser light reflectivity of the obstacle is low, the reflected laser light cannot be received sufficiently as described above.

For this reason, the obstacle or the like is not detected based on the reception of the laser light. Rather it is so determined that the obstacle is present, if no laser light is received although the laser light is projected from the laser sensor 9 in the downward direction. As a result, although the distance to the obstacle cannot be calculated, it is at least possible to detect the presence of the obstacle, which will probably have an influence on the opening of the door.

Figure 12:
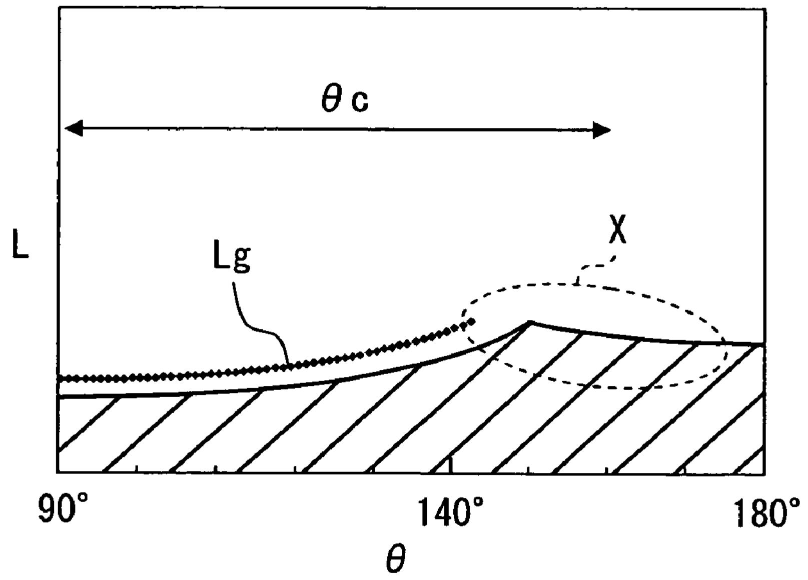
FIG. 12 is a graph showing a distance to the ground and a distance to the next vehicle in case of presence of the obstacle, to which the laser light is incident shallowly, the distances being detected based on results of projection and reception of the laser light by scanning the scan area from 90° to 180° by the laser sensor.

FIG. 12 shows a result of calculation of distances in a case that the other vehicle is parked near the subject vehicle. Each distance is calculated based on a result of projection and reception of the laser light of the laser sensor 9 over the scan angle range from 90° to 180°. As shown in FIG. 12, the laser sensor 9 receives the laser light reflected by the ground up to the scan angle of about 140° and hence the distance Lg to the ground can be calculated. The laser light is started to be projected to the side surface of the adjacent vehicle if the scan angle reaches about 140°. As a result, the reflected laser light cannot be received thereafter and the distance L cannot be calculated (range X indicated by a dotted line in FIG. 12). If the laser sensor 9 does not receive the reflected laser light after an elapse of a predetermined time from projection of the laser light, the laser sensor 9 determines that the distance to the obstacle is ∞ (infinity) and outputs its determination. The vehicle door opening angle control processing executed by the ECU 1 is described next with reference to the flowcharts shown in FIGS. 13 and 14.

Figure 13:
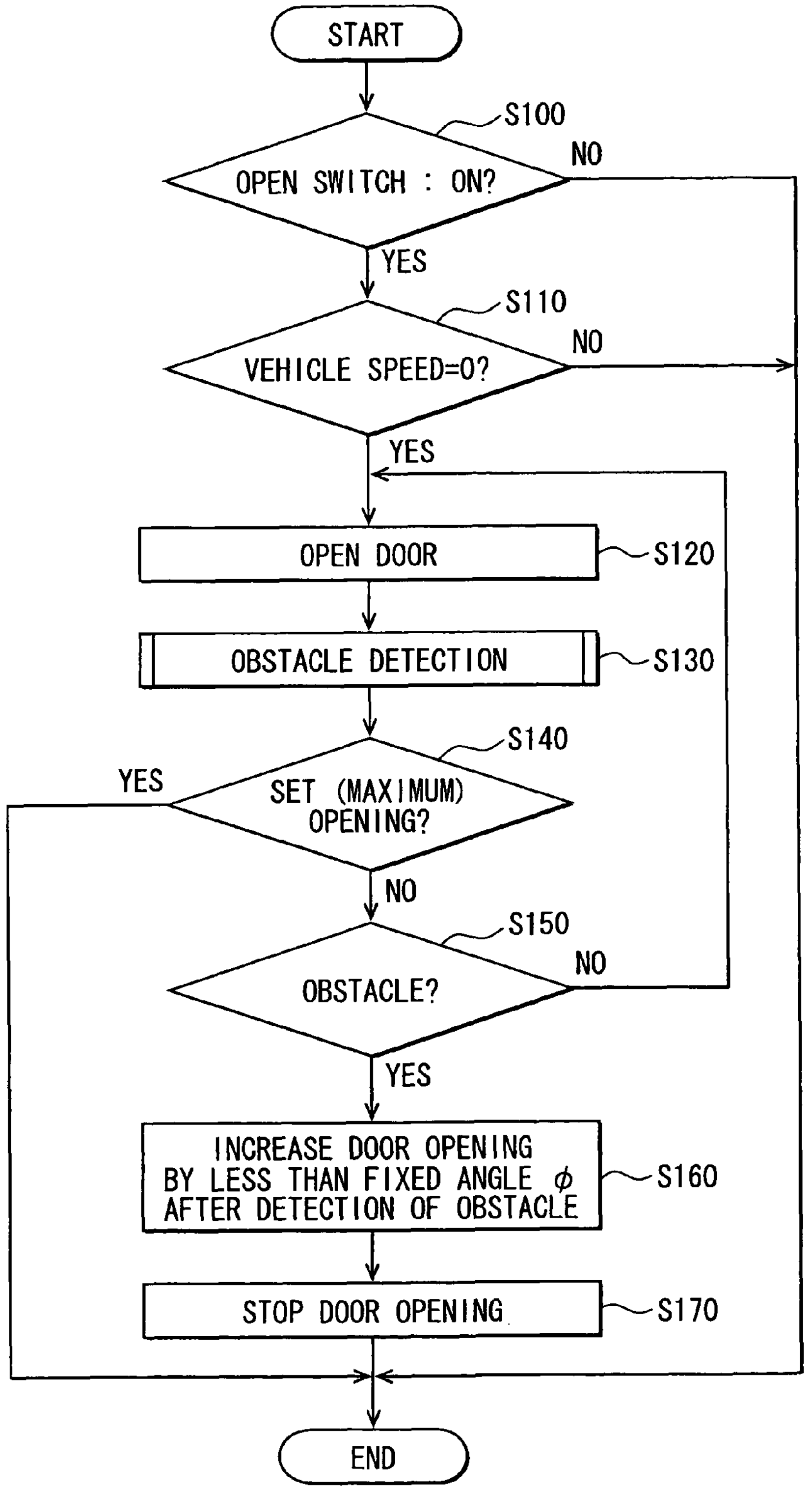
FIG. 13 is a flowchart showing a main routine of vehicle door opening angle control processing.

Referring to FIG. 13, it is checked at step S100 whether the open switch 6 has been turned on by a passenger of the vehicle. If it is determined that the open switch 6 has been turned on, step S110 is executed to check whether the vehicle speed signal of the vehicle speed sensor 10 indicates that the vehicle speed V=0. That is, at S110, it is checked whether the vehicle is at rest.

If it is determined at step S110 that the vehicle speed indicates V=0, step S120 is executed to start opening of the vehicle door by outputting drive signals from the motor driver 5 to the open/close motor 12 and the release motor 13. At step S130, it is checked whether any obstacle, which the vehicle door is likely to touch, is present based on the obstacle detection result of the laser sensor 9. This obstacle detection processing is described in detail later.

It is checked at step S140 based on the detection signal of the opening angle sensor 11 whether the opening angle of the vehicle door 30 has reached a set (maximum) angle, which is predetermined for automatic opening of the vehicle door 30. If it is determined at the check processing of step S140 that the opening angle of the vehicle door 30 has reached the set opening angle, step S170 is executed. If it is determined that the opening angle of the vehicle door 30 has not reached the set opening angle yet, step S150 is executed.

At step S150, it is checked whether the vehicle door 30 will possibly touch an obstacle based on the detection result of the obstacle detection processing. If it is determined at step S150 that no obstacle is present, the processing returns to step S120. By thus repeating the execution of processing from step S120 to step S150, the detection of any obstacle against the vehicle door 30 is continued while the vehicle door 30 is in the opening movement.

If it is determined at check step S150 that the obstacle is present, the open/close motor 12 is continued to be driven even after the detection of the obstacle. When the vehicle door 30 is further opened by the open/close motor 12 from the opening angle, at which the obstacle has been detected, by an amount of angle corresponding to the distance between the surface of the vehicle door and the scan plane of the laser light, the opening angle of the vehicle door 30 is limited. That is, the opening of the vehicle door is stopped after the opening angle of the vehicle door 30 is increased by less than the predetermined angle ϕ. Thus, since the vehicle door can be opened as much as possible within a range, in which the door will not touch the obstacle, the vehicle user can utilize the automatic door opening function as much as possible.

It is preferred that the latch mechanism is only released from the latch condition (the vehicle door is only half-latched) by the latch release motor 13 and is not opened any further, when the obstacle is detected immediately after start of opening the vehicle door 30, that is, when the vehicle door 30 is still substantially closed.

This is because the distance between the vehicle door 30 and the obstacle cannot be calculated accurately in a case that the obstacle is detected when the vehicle door 30 is still in substantially closed condition, that is, immediately after the laser sensor 9 has started its obstacle detection operation. It is however preferred to release the latch mechanism by the latch release motor 13 because it is likely to be determined that the vehicle door is in failure if the vehicle door is not accompanied by opening operation at all.

At step S170, opening of the vehicle door 30 is stopped and the opening angle of the vehicle door 30 is maintained by stopping the drive of the open/close motor 12.

The obstacle detection processing is described next with reference to the flowchart of FIG. 14.

First at step S200, the CPU 3 reads the obstacle detection range data from the non-volatile memory 4. At the following step S210, the scan angle θn is set to a value (0°), which corresponds to a start position of the scan range. It is checked at step S220 whether the scan angle θn has reached an upper limit angle θmax, which corresponds to an end position of the scan range of the laser light. If it is determined at step S220 that the scan angle has reached the upper limit angle, the scan angle θn is reset at step S230 to the value (0°), which corresponds to the start position of the scan range of the laser light.

At step S240, the laser sensor 9 is commanded to project the laser light at the set scan angle θn. The laser sensor 9 calculates the distance to the obstacle based on the difference of time between the projection and the reception of the laser light, if the reflected light corresponding to the projected laser light is received. If the laser sensor 9 does not receive the reflected light of the projected light within a predetermined time, it outputs a distance Xn corresponding to ∞ (infinity).

At step S250, the distance Xn from the laser sensor 9 to the obstacle is compared with a set distance Ln. If it is determined at step S250 that the distance Xn to the obstacle is longer than the set distance Ln, the obstacle is considered as not being present within the movable range of the vehicle door 30. In this instance, step S260 is executed.

It is checked at step S260 whether the scan angle θ of the projected laser light is within the predetermined check angle area θc (for example, within a range of scan angle between 90° and 150°) and the distance Xn inputted from the laser sensor 9 is ∞ (infinity).

The predetermined check angle area is set to an angle range, in which the laser light is projected from the laser sensor 9 in the downward direction. As a result, even if no obstacle is present, the laser sensor 9 is supposed to receive the laser light reflected by the ground. It can be determined in the check processing at step S260 that, if the distance Xn to the obstacle is ∞ (infinity), there should be a certain obstacle and the laser light has been reflected or scattered by the obstacle in directions other than the direction toward the laser sensor 9. That is, step S260 is executed to check whether it is in the condition that a sufficient amount of the reflected laser light cannot be received from the obstacle because of shallow incidence of the laser light to the obstacle or the low reflectivity of the obstacle against the laser light.

In the first embodiment, the check angle area is set to be narrower than the entire range, in which the laser light is projected downward from the position of the laser sensor 9, and it is checked whether the distance Xn is ∞ (infinity) if the scan angle θ of the laser light is within the check angle area. Even if the scan angle θ of the laser light is within the range, in which the laser light is projected downward from the position of the laser sensor 9, the distance, which the laser light travels to reach the ground becomes longer as the direction of projection of the laser light approaches the horizontal direction. It becomes more, likely that the laser light is projected to the obstacle, which will not reflect the laser light sufficiently as the distance of travel of the laser light to reach the ground becomes longer. Thus, even when the laser light is projected from the subject vehicle to an obstacle located at a remote position and a sufficient amount of the reflected laser light cannot be received, the laser sensor 9 calculates that the distance Xn is ∞ (infinity).

Such an obstacle however does not affect the opening and closing of the vehicle door 30 of the subject vehicle. For this reason, to prohibit as much as possible detection of any obstacle, which will not affect the opening and closing of the door of the subject vehicle, it is determined that the obstacle is present based on no reception of the laser light by the laser sensor 9 only in the limited check angle area, which is not the entire range of projection of the laser light in the downward direction.

If NO is produced at step S260, step S270 is executed to update the scan angle θn by incrementing the scan angle θn by a predetermined step angle θx. Returning to step S220, the laser light is projected from the laser sensor 9 at the updated scan angle θn or the reset scan angle θn.

If YES is produced at step S260, step S280 is executed to determine that the obstacle, which the vehicle door 30 will touch, is present. After step S280, it is finally determined at step S150 of the main routine shown in FIG. 13 that the obstacle is present.

Figure 14:
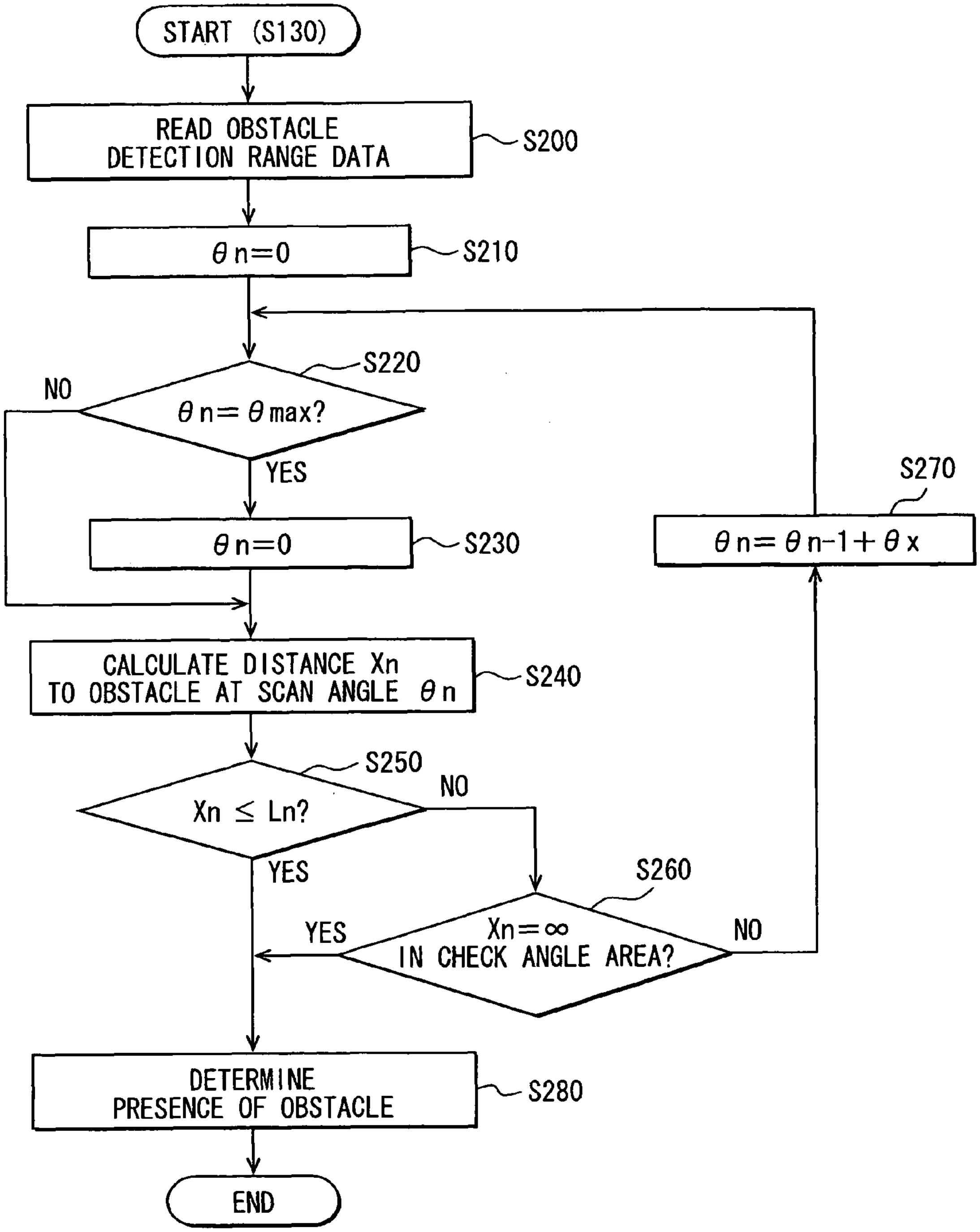
FIG. 14 is a flowchart showing details of obstacle detection processing in the main routine shown in FIG. 13.

In the obstacle detection processing in the flowchart shown in FIG. 14, the processing from step S220 to step S270 is repeated unless the obstacle is detected while the vehicle door is being opened. In parallel to (by time-sharing) the repetition of the obstacle detection processing, the processing from step S120 to step S150 of the main routine is repeated.

Second Embodiment

The vehicle door opening angle control system according to the second embodiment of the present invention will be described next. This door opening angle control system is configured to have the same configuration as that of the first embodiment. In the first embodiment, it is assumed that a sufficient amount of laser light cannot be received, because the obstacle is present near the subject vehicle and the laser light is incident to the obstacle shallowly. With this assumption, it is determined that the obstacle is present, if the reflected laser light cannot be received even when the laser light is projected downward from the laser sensor 9.

Figure 15A:
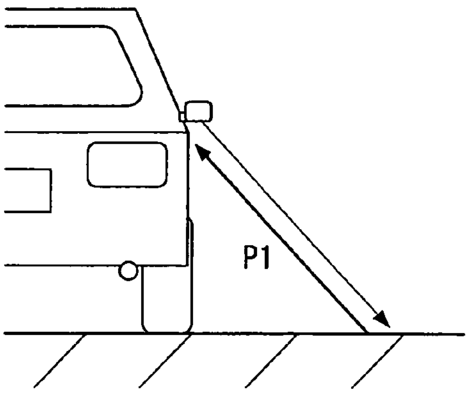
FIGS. 15A and 15B are schematic views showing examples of operations of a vehicle door opening angle control system according to the second embodiment of the present invention.
Figure 15B:
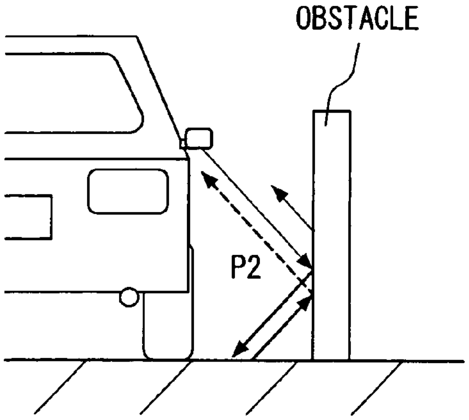

However, if the obstacle is present near the vehicle as shown in FIG. 15B and the obstacle has a certain level of a mirror reflectivity and a low level of refractive reflectivity against the laser light, the laser sensor 9 will possibly receive the laser light reflected by the ground by way of the obstacle. That is, if the laser light projected from the laser sensor 9 is incident to the obstacle in a shallow angle, the laser light will be reflected by the obstacle toward the ground. As a result, the laser light reflected by the ground will return to the laser sensor 9 by way of the obstacle. If the laser sensor 9 receives such a reflected laser light, it is likely to be determined that no obstacle is present because the received laser light is generated by the reflection at the ground.

According to this embodiment, it is further differentiated in the obstacle detection processing of the first embodiment whether the laser light is reflected directly by the ground or indirectly by the ground by way of the obstacle based on the intensity of the received laser light (received light intensity).

Even if the obstacle has a shiny surface and a certain level of the mirror reflectivity against the laser light, a part of the laser light will be scattered or absorbed by the surface of the obstacle unless the mirror reflectivity is 100%. It rarely arises that an obstacle having a mirror reflectivity of 100% is located near the vehicle. Therefore, a received light intensity P2 of the laser light indirectly reflected by the ground by way of the obstacle as shown in FIG. 15B becomes weaker than a received light intensity P1 of the laser light directly reflected by the ground as shown in FIG. 15A. According to this embodiment, it is differentiated based on the difference in the received light intensities whether the laser light has been directly reflected by the ground or indirectly reflected by way of the obstacle.

Specifically, the intensity of the laser light outputted from the laser sensor 9 is adjusted so that, although the reflected laser light directly reflected by the ground exceeds a threshold value provided for checking the reception of the reflected laser light, the reflected laser light indirectly reflected by the ground by way of the obstacle does not exceed the threshold value. With this adjustment, no reflected laser light is detected by the laser sensor 9 in case that the laser light is indirectly reflected by the ground by way of the obstacle. As a result, the presence of the obstacle can be detected based on that no laser light is reflected.

The intensity of the laser light may be adjusted to a fixed value or a variable value. In case of adjusting the intensity of the laser light outputted from the laser sensor 9, the intensity of the laser light outputted from the laser sensor 9 is pre-adjusted so that the reflected laser light, which slightly exceeds the threshold value, when the laser light is directly reflected by a ground surface such as a black asphalt road surface, which reflects relatively low amount of laser light. The intensity of laser light may be adjusted by varying the voltage supplied to the light emitting element 22 in the laser sensor 9.

By thus adjusting the intensity of the laser light outputted from the laser sensor 9, the intensity of the received laser light received indirectly by way of the obstacle can be made lower than the threshold value, while the intensity of the received laser light directly reflected by almost all kinds of ground surfaces exceeds the threshold value.

In case of adjusting the intensity of the laser light outputted from the laser sensor 9 to variable values, the laser light is projected by the laser sensor 9 toward the road surface under a condition that the vehicle is at rest and the vehicle door 30 is kept closed. The intensity of the laser light outputted from the laser sensor 9 is adjusted so that the intensity of the received laser light slightly exceeds the threshold value when the laser light reflected by the ground is received.

In this case, it is preferred that the intensity of the laser light outputted from the laser sensor 9 is adjusted based on the intensity of the received laser light, which is received when the laser light having the scan angle in the check angle area described in the first embodiment. This is because the obstacle present in the check angle area is highly likely to affect the opening and closing of the vehicle door 30 of the subject vehicle.

It is preferred to set the intensity of the laser light outputted from the laser sensor 9 so that the lowest one of the intensities of the received laser lights, which result from laser lights projected at different scan angles in the predetermined angle area, at least exceeds the threshold value. Thus, when the laser light is directly reflected by the ground irrespective of the scan angle, the intensity of the received laser light exceeds the threshold value. However, when the laser light is indirectly reflected by the ground by way of the obstacle, the intensity of the received laser light does not exceed the threshold value.

By adjusting, each time the vehicle stops, the intensity of the laser light outputted from the laser sensor 9 in accordance with the intensity of the laser light directly reflected by the ground, the laser sensor 9 can output the laser light at the intensity suitable for the laser light reflectivity of the ground, on which the vehicle is stopping. As a result, it can be differentiated with high accuracy, based on the intensity of the received laser light, whether the laser light has been reflected by the ground directly or indirectly by way of the obstacle.

Third Embodiment

The vehicle door opening angle control system according to the third embodiment of the present invention will be described next. This door opening angle control system is also configured to have the same configuration as that of the first embodiment.

In the second embodiment, it is differentiated by adjusting the intensity of the laser light outputted from the laser sensor 9 whether the laser light has been reflected directly by the ground or indirectly by the ground by way of the obstacle. According to this embodiment, it is differentiated based on changes over time in the intensity of the received laser light whether the laser light has been directly reflected or indirectly reflected by way of the obstacle.

The method of differentiating whether the received laser light results from the direct reflection at the ground or the indirect reflection by way of the obstacle is described with reference to FIG. 16.

This obstacle detection processing is the same as that of the first embodiment shown in FIG. 14 in most of the processing and hence only different processing is described.

Figure 16:
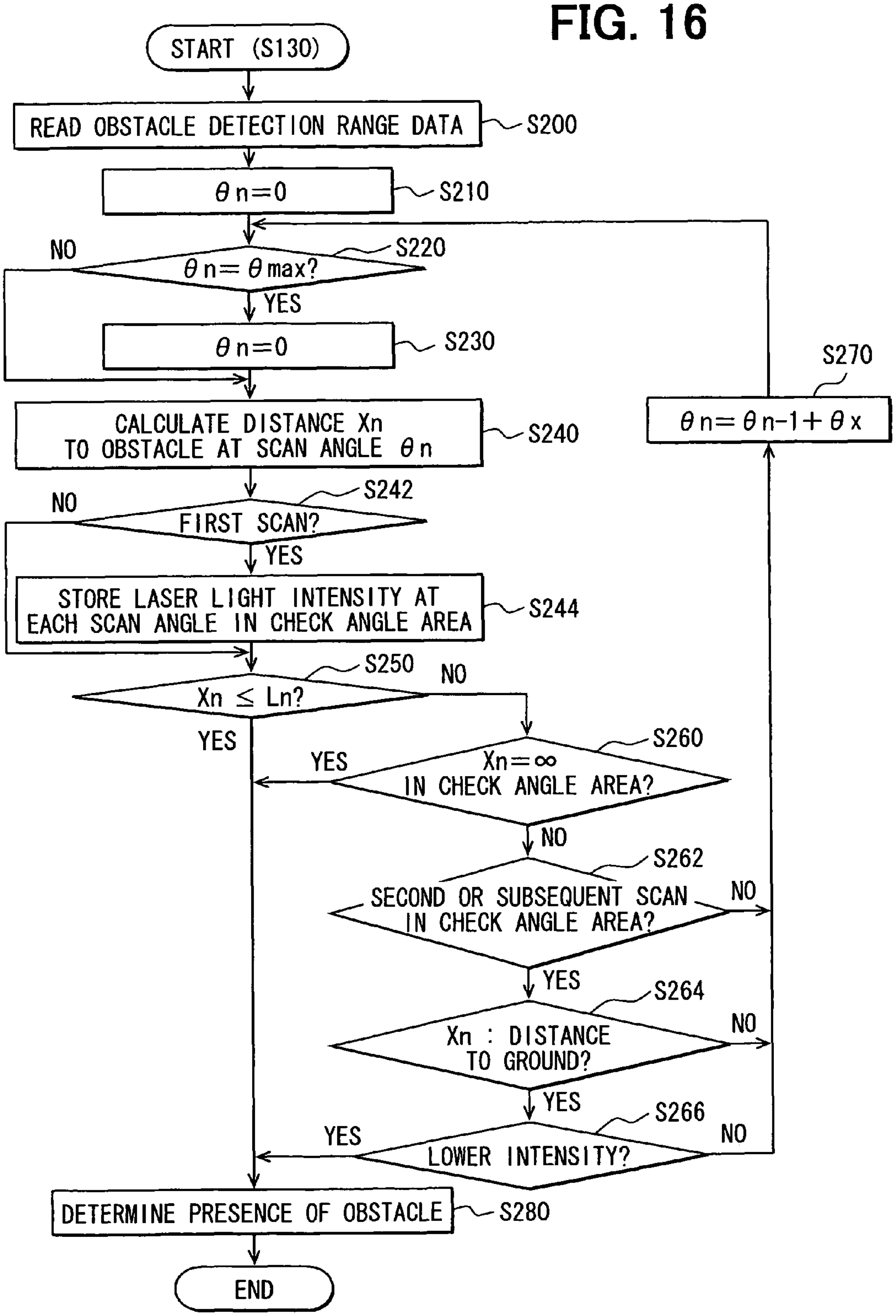
FIG. 16 is a flowchart showing obstacle detection processing of a vehicle door opening angle control system according to the third embodiment of the present invention.

In the flowchart of FIG. 16, steps S242, S244, S262, S264 and S266 are additionally provided relative to the flowchart of FIG. 14.

It is checked at step S242 whether it is the first laser light scan by the laser sensor 9 after the opening of the vehicle door 30 is commanded. If it is the first scan, the vehicle door 30 is still in almost the closed condition. The laser light at the scan angle within the check angle area is reflected directly by the ground.

If YES is produced at step S242, step S244 is executed. At step S244, the intensity of the received laser light is stored with respect to each scan angle in the check angle area. Thus, information regarding the intensity of the received laser light reflected directly by the ground is acquired.

It is checked at step S262 whether the scan angle of the laser sensor 9 has already reached the upper limit angle at least once and is now within the check angle area in the second or subsequent scan, which starts anew from the scan angle $\theta n=0°$. If it is not the second or subsequent scan or the scan angle of the laser light is not within the check angle area, step S270 is executed. If it is the second or subsequent scan and the scan angle is within the check angle area, step S264 is executed.

It is checked at step S262 whether the distance Xn measured at step S240 corresponds to the distance to the ground. This check processing may be performed by measuring and pre-storing the distance to the ground with respect to each scan angle within the check angle area and further comparing the distance with the stored distance. In the first scan by the laser sensor 9, the laser light at the scan angle within the check angle area is directly reflected by the ground. It is therefore possible to pre-store the intensity of the received laser light and the distance acquired in the first scan and thereafter check whether the distance Xn measured at each scan angle corresponds to the distance to the ground with reference to the distance stored with respect to each scan angle.

If it is determined at step S264 that the measured distance Xn corresponds to the distance to the ground, step S266 is executed. It is checked at step S266 whether the intensity of the received laser light is decreased to be lower than a predetermined threshold value relative to the intensity of the received laser light stored at step S244. In this intensity check operation, it is preferred to compare the two intensities at the same scan angle. It is thus possible to maintain the accuracy of checking lowering of the intensity by comparing the two under the same conditions as much as possible.

If it is determined at step S266 that the intensity of the received laser light is decreased to be lower than the predetermined threshold value, the intensity of the received light is lowered although the laser light has been reflected by the ground. In this case accordingly, it can be determined that the laser light has not been reflected directly by the ground but has been reflected indirectly by the ground by way of the obstacle. Thus step S280 is executed.

According to the third embodiment, the intensity of the received laser light is stored with respect to each scan angle when the first scan is performed by the laser sensor 9 and the stored intensity of the received laser light is used in comparison. Thus, it is checked whether the intensity of the received laser light has decreased in the second and subsequent scan. It is however possible to check by other methods without being limited to this example whether the intensity of received light has decreased.

For example, in place of always referring to the intensity of the received laser light acquired in the first scan, the intensity of the received laser light may be stored each time the scan is repeated and the lowering of the intensity of the received light may be determined by comparison with the intensity of the received laser light acquired in the previous scan. It is also possible to calculate a moving average of a predetermined number of intensities of the received laser light acquired in a plurality of last scans and determine lowering of the intensity of the received light by comparison with the moving average.

Although the intensities of the received laser lights at the same scan angle are compared in the foregoing example, the scan angle need not always be the same. It is therefore possible, for example, to determine lowering of the intensity of the received light by comparing in one scan the intensity of the received light detected in the past and the intensity of the received light detected at present.

The present invention is not limited to the foregoing embodiments but may be implemented in other modified examples.

Figure 9:
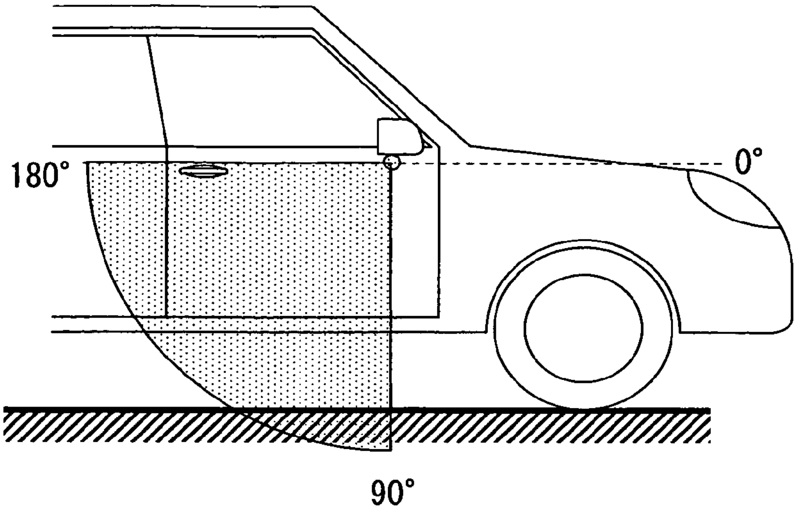
FIG. 9 is a schematic view showing a scan area from 90° to 180° covered by the laser sensor.

For example, the vehicle door 30 normally has a glass window at its upper part and hence the passenger in the vehicle can readily view the side environment of the vehicle. In addition, since the laser sensor 9 is provided near the pivot axis of the vehicle door 30, the door part existing forward of the position of the laser sensor 9 is little and the distance of movement at the time of opening the door is small. It is thus relatively not so necessary to detect the obstacle by the laser sensor 9 in a range, in which the window of the vehicle door is provided or the door part existing forward of the position of the laser sensor 9. For this reason, the scan range may be limited as shown in FIG. 9, in which the scan range starts at immediately below the mounting position of the laser sensor 9 and ends near an upper end part of the vehicle door part existing below the glass window. Even if the scan range of the laser light is thus limited, any obstacle that exists near the vehicle door part below the glass window, which is a dead zone for the vehicle passenger, can be detected without fail. By thus narrowing the scan range of the laser light, the electric power consumption can be reduced, the response characteristic in the obstacle detection can be improved and the accuracy in the obstacle detection can be enhanced.

In case that the laser sensor 9 mounted on the door mirror is sufficiently distanced from the surface of the vehicle door, the laser light of the laser sensor 9 may scan a plane, which is in parallel to the surface of the vehicle door 30, in place of scan the plane, which is oriented in the opening direction of the vehicle door 30 by the predetermined angle $\phi$. That is, the predetermined angle $\phi$ may be 0°.

In case that the opening angle of the vehicle door is limited in accordance with the detection of the obstacle, the vehicle door opening angle control system according to the foregoing embodiments may be implemented as well in such systems, in which the vehicle door is manually opened and closed by the passenger of the vehicle.

The laser sensor 9 may be mounted on the vehicle door itself. Further, the laser sensor 9 may be mounted within a support shaft, which fixes the door mirror to the vehicle door 30. According to this configuration, the design characteristic is enhanced in comparison to the case, in which the laser sensor 9 is mounted on the lower part of the door mirror.

Sharing of the operation may be changed. For example, the ECU may calculate the distance to the obstacle, or the laser sensor 9 may project the laser light while determining by itself the scan angle θn. In a case that the laser sensor 9 determines the scan angle θn by itself, the laser sensor 9 is required to notify the ECU 1 of the determined scan angle θn.

What is claimed is:

1. A vehicle door opening angle control system comprising:

a laser sensor mounted on a vehicle door near a pivot axis of the vehicle door to project a laser light to scan a plane oriented in an opening direction of the vehicle door and receive a reflected light reflected by an obstacle;

a check section that checks whether the obstacle, which the vehicle door is likely to touch, is present in the door opening direction based on the projection and reception of the laser light by the laser sensor; and an opening angle limit section that limits an opening angle of the vehicle door when the check section determines that the obstacle is present; wherein the check section determines that the obstacle is present when the laser sensor receives no laser light in excess of a predetermined intensity in response to projection of the laser light in a downward direction relative to a mounting position of the laser sensor;

the laser sensor projects the laser light of an intensity so that the reflected laser light reflected directly by a ground exceeds a threshold value provided for checking reception of the reflected laser light and the reflected laser light reflected indirectly by the ground by way of the obstacle does not exceed the threshold value; and the laser sensor projects the laser light of the intensity, which is predetermined to a fixed value.

2. A vehicle door opening angle control system comprising:

a laser sensor mounted on a vehicle door near a pivot axis of the vehicle door to project a laser light to scan a plane oriented in an opening direction of the vehicle door and receive a reflected light reflected by an obstacle;

a check section that checks whether the obstacle, which the vehicle door is likely to touch, is present in the door opening direction based on the projection and reception of the laser light by the laser sensor; and an opening angle limit section that limits an opening angle of the vehicle door when the check section determines that the obstacle is present; wherein the check section determines that the obstacle is present when the laser sensor receives no laser light in excess of a predetermined intensity in response to projection of the laser light in a downward direction relative to a mounting position of the laser sensor;

the laser sensor projects the laser light of an intensity so that the reflected laser light reflected directly by a ground exceeds a threshold value provided for checking reception of the reflected laser light and the reflected laser light reflected indirectly by the ground by way of the obstacle does not exceed the threshold value; and the laser sensor projects the laser light toward the ground each time the vehicle stops with the vehicle door being closed, and variably adjusts the intensity of the laser light to be projected based on an intensity of the received laser light received in response to projection of the laser light under a vehicle stop condition.

3. The vehicle door opening angle control system according to claim 2, wherein:

the check section checks whether the obstacle is present when the laser light is projected in a predetermined angle range narrower than an entire angle range of projection of the laser light in the downward direction relative to the mounting position of the laser sensor.

4. The vehicle door opening angle control system according to claim 2, wherein:

the opening angle limitation section limits the opening angle of the vehicle door, when the vehicle door is opened from an opening angle, at which the check section determines that the obstacle is present, by an angle corresponding to a distance between a surface of the vehicle door and the scan plane of the laser light.

5. The vehicle door opening angle control system according to claim 2, wherein:

the laser sensor scans, by the laser light, only an area corresponding to a vehicle door part, which is lower than a glass window provided at an upper part of the vehicle door.

6. The vehicle door opening angle control system according to claim 2, wherein the laser light scans only the plane oriented in the door opening direction.

7. The vehicle door opening angle control system according to claim 2, wherein the plane scanned by the laser moves with the vehicle door.

8. A vehicle door opening angle control system comprising:

a laser sensor mounted on a vehicle door near a pivot axis of the vehicle door to project a laser light to scan a plane oriented in an opening direction of the vehicle door and receive a reflected light reflected by an obstacle;

a check section that checks whether the obstacle, which the vehicle door is likely to touch, is present in the door opening direction based on the projection and reception of the laser light by the laser sensor; and an opening angle limit section that limits an opening angle of the vehicle door when the check section determines that the obstacle is present; wherein the check section determines that the obstacle is present when the laser sensor receives no laser light in excess of a predetermined intensity in response to projection of the laser light in a downward direction relative to a mounting position of the laser sensor;

the check section determines that the obstacle is present, if a result of projection and reception of the laser light by the laser sensor indicates reflection of the laser light by the ground but an intensity of the received laser light is lower than that of the reflected laser light reflected by the ground previously; and the check section compares the intensities of the received laser lights reflected by the ground at a same scan angle in comparing the intensity of the received laser light with that of the reflected laser light directly reflected by the ground previously.

9. A vehicle door opening angle control system comprising:

a laser sensor mounted on a vehicle door near a pivot axis of the vehicle door to project a laser light to scan a plane oriented in an opening direction of the vehicle door and receive a reflected light reflected by an obstacle;

a check section that checks whether the obstacle, which the vehicle door is likely to touch, is present in the door opening direction based on the projection and reception of the laser light by the laser sensor; and an opening angle limit section that limits an opening angle of the vehicle door when the check section determines that the obstacle is present: wherein the check section determines that the obstacle is present when the laser sensor receives no laser light in excess of a predetermined intensity in response to projection of the laser light in a downward direction relative to a mounting position of the laser sensor;

the check section pre-stores distances from the mounting position of the laser sensor to an end of the vehicle door with respect to each scan direction of the laser sensor, calculates the distance to the obstacle based on a result of projection and reception of the laser light by the laser sensor, and determines that the obstacle is present at a position, at which the vehicle door is likely to touch the obstacle, if the calculated distance to the obstacle is shorter than the pre-stored distance to the end of the vehicle door.

10. A vehicle door opening angle control system comprising:

a laser sensor mounted on a vehicle door near a pivot axis of the vehicle door to project a laser light to scan a plane oriented in an opening direction of the vehicle door and receive a reflected light reflected by an obstacle;

a check section that checks whether the obstacle, which the vehicle door is likely to touch, is present in the door opening direction based on the projection and reception of the laser light by the laser sensor; and an opening angle limit section that limits an opening angle of the vehicle door when the check section determines that the obstacle is present; wherein the check section determines that the obstacle is present when the laser sensor receives no laser light in excess of a predetermined intensity in response to projection of the laser light in a downward direction relative to a mounting position of the laser sensor;

the laser sensor is mounted directly on the vehicle to move with the vehicle door; and the plane scanned by the laser sensor is deviated from a surface of the vehicle door by a predetermined angle.

11. The vehicle door opening angle control system according to claim 10, wherein the laser light scans only the plane oriented in the door opening direction.

* * * * *